(12) United States Patent  
Baek

(10) Patent No.: US 10,008,055 B2  
(45) Date of Patent: Jun. 26, 2018

(54) REVERSE TRACE-PREVENTING WIRELESS RECOGNITION SECURE ENTRY METHOD AND SECURE ENTRY SYSTEM USING SAME

(71) Applicant: NEO MOBILE TECHNOLOGY, INC., Osan-si, Gyeonggi-do (KR)

(72) Inventor: Jae Gu Baek, Suwon-si (KR)

(73) Assignee: NEO MOBILE TECHNOLOGY, INC., Osan-si (KR)

( * ) Notice: Subject to any disclaimer, the term of this patent is extended or adjusted under 35 U.S.C. 154(b) by 0 days. days.

(21) Appl. No.: 15/508,478

(22) PCT Filed: Aug. 28, 2015

(86) PCT No.: PCT/KR2015/009079  
§ 371 (c)(1),  
(2) Date: Mar. 2, 2017

(87) PCT Pub. No.: WO2016/036070  
PCT Pub. Date: Mar. 10, 2016

(65) Prior Publication Data  
US 2017/0287246 A1    Oct. 5, 2017

(30) Foreign Application Priority Data  
Sep. 3, 2014  (KR) ........................ 10-2014-0117234

(51) Int. Cl.  
*G07C 9/00* (2006.01)  
*H04L 9/08* (2006.01)  
*G06K 7/10* (2006.01)

(52) U.S. Cl.  
CPC ...... *G07C 9/00111* (2013.01); *G06K 7/10366* (2013.01); *G07C 9/00309* (2013.01); *H04L 9/0861* (2013.01); *G07C 2009/00412* (2013.01)

(58) Field of Classification Search  
CPC ............ G07C 9/00111; G07C 9/00309; G06K 7/10366; H04L 9/0861  
USPC ........................................................ 340/5.21  
See application file for complete search history.

(56) References Cited

U.S. PATENT DOCUMENTS

| 4,193,131 | A | * | 3/1980 | Lennon | .............. | G06Q 20/3829 340/5.8 |
| 2004/0160322 | A1 | | 8/2004 | Stilp | | |
| 2014/0260452 | A1 | * | 9/2014 | Chen | .................. | G07C 9/00174 70/279.1 |

FOREIGN PATENT DOCUMENTS

| JP | 2008-202305 A | 9/2008 |
| KR | 10-2009-0126019 A | 12/2009 |
| KR | 10-2011-0074441 A | 6/2011 |
| KR | 10-2012-0058990 A | 6/2012 |
| KR | 10-1410875 B1 | 6/2014 |

\* cited by examiner

*Primary Examiner* — Yong Hang Jiang  
(74) *Attorney, Agent, or Firm* — Maschoff Brennan

(57) ABSTRACT

The present invention relates to a secure entry method of a radio-frequency identification (RFID) secure entry system including a tag, a reader, a detector, a remote controller, and a locker. According to the present invention, since different data is exchanged all the time using a pre-shared encryption/decryption algorithm to transmit/receive the same data, even when reverse detection occurs from outside, accurate detection may not be easy. Furthermore, since a frequency for data transmission is randomly allocated within a pre-defined frequency list, reverse detection and jamming during communication may be prevented.

5 Claims, 7 Drawing Sheets

REVERSE TRACE-PREVENTING WIRELESS RECOGNITION SECURE ENTRY METHOD AND SECURE ENTRY SYSTEM USING SAME

TECHNICAL FIELD

The present invention relates to a radio-frequency identification (RFID) secure entry method capable of preventing reverse detection, and a secure entry system using the method and, more particularly, to a secure entry method capable of preventing frequency jamming and preventing wiretapping or reverse detection from outside by transmitting or receiving double-encrypted data on a randomly selected frequency in a secure entry system including a detector, a tag, a reader, a remote controller, and a locker.

BACKGROUND ART

In an entry system, radio-frequency identification (RFID) is vulnerable to security problems such as wiretapping, forgery, and denial of service (DoS).

In a generalized RFID entry system, readers and tags are provided based on encryption security standards such as electronic product code (EPC)-global standards only for a limited scope of memory access or special instructions, and do not perform any particular identification process for general tag identification. When a reader and a tag exchange identification information based on wireless communication, if an entry procedure is performed without an identification process, an illegal reader may easily obtain the identification information of the tag and thus personal information may leak.

For example, information of a non-secure RFID tag attached to an ID card can be obtained by any user having a reader capable of reading the same frequency. In addition, a malicious attacker may illegally obtain product information and personal information by analyzing traffic of a reader and a tag. If the attacker uses a forged reader, the memory of the tag may be easily corrupted, or erased in the worst case. The reader and the tag basically operate based on a question and answer mechanism and thus may be vulnerable to DoS attacks.

An RFID network has a much greater number of tags and nodes to be managed, compared to a conventional network, has an autonomously distributed structure, rather than a centralized structure, and thus is more vulnerable to security problems compared to the conventional network.

Furthermore, in an environment where multiple densely-arranged readers and tags need to be simultaneously used in a narrow place, e.g., a speed gate, frequency jamming may occur due to inappropriate frequency distribution.

Although technologies related to a mutual identification process between a reader and a tag have been disclosed, an encryption/decryption process thereof uses a slow and complicated symmetric cryptosystem or a heavy algorithm such as a hash function, and requires a large memory capacity. This encryption scheme may not be easily applied to large-volume and low-price RFID systems, and thus a security method appropriate for subminiature readers and tags is necessary.

KR 10-2011-0074441 discloses a technology for encrypting data using a cyclic redundancy check (CRC) computing function, but lacks solutions to reverse frequency detection.

DISCLOSURE

Technical Problem

Therefore, the present invention has been made in view of the above problems, and it is one object of the present invention to provide a secure entry method for encrypting data, transmitting the encrypted data on a randomly generated frequency, and sharing next frequency information only between two parties who participate in transmission/reception, to prevent reverse detection from outside.

The above and other objects can be accomplished by the present invention described below.

Technical Solution

In accordance with one aspect of the present invention, provided is a secure entry system including a reader, and a detector, a remote controller, a locker, and a tag corresponding to peripheral devices connected to and communicating with the reader in a wireless or wired manner.

In accordance with another aspect of the present invention, provided is a secure entry method including a first step of transmitting and sharing a common identifier (ID), a master key, and a frequency list to and with a tag by a reader to register the tag, a second step of primarily encrypting data using the master key, secondarily encrypting the data using a temporary key, and transmitting the encrypted data together with the temporary key and the non-encrypted common ID to the tag on a first frequency corresponding to a designated frequency, by the reader to transmit the data to the tag in a wireless manner, a third step of extracting the common ID from the received data, comparing the extracted common ID to the stored common ID to primarily determine whether the reader is a registered reader, if the reader is a non-registered reader, returning to a standby mode without decrypting the data, and, if the reader is a registered reader, extracting the temporary key, primarily decrypting the received encrypted data using the temporary key, and secondarily decrypting the data using the master key to secondarily determine whether the reader is a registered reader and to check a variable frequency, by the tag, a fourth step of primarily encrypting data using the master key, secondarily encrypting the data using a temporary key, and transmitting the encrypted data on a second frequency corresponding to the variable frequency set by the reader, by the tag, and a fifth step of primarily decrypting the data received on the second frequency, using the master key, and secondarily decrypting the data using a temporary key to determine whether to permit entry, by the reader, wherein the data includes an ID of the reader or the peripheral device, a control signal, and information about a variable frequency for next communication, wherein the designated frequency is defined when a system is installed, and wherein the variable frequency is randomly selected within the frequency list set when the system is installed.

After the fifth step, to check a location and a route pattern of a user, the reader may transmit a control signal for additional information to the tag on a third frequency corresponding to a variable frequency set by the tag, and the tag may transmit an acknowledgement signal to the reader on the second frequency and transmit the additional information for the control signal to the reader on a fourth frequency corresponding to a variable frequency set by the reader, periodically or whenever an event occurs.

The master key may be randomly generated by the reader, shared with the peripheral devices when the system is installed, used for primary encryption, and periodically or aperiodically changed, updated, or discarded from the reader as instructed by an operator, and the temporary key may be randomly generated by the reader as a one-time key, used for secondary encryption, inserted into the data in a distributed manner, and discarded after use when a transmission/reception identification session is completed.

In a host-linked system, the reader of the fifth step may transmit the decrypted data to a host, and the host may determine whether to permit entry and transmit a result of determination to the reader.

In accordance with yet another aspect of the present invention, provided is a secure entry system including a detector installed at an entrance to detect a user in a contact or contactless manner, transmit a detection signal to a reader by wire or on a second frequency, and receive an acknowledgement signal from the reader on a ninth frequency, the reader configured to transmit a reader identifier (ID) to a tag on a first frequency, receive tag information from the tag on a second frequency, and transmit an entry permission signal to the tag on a third frequency, the tag configured to receive the reader ID on the first frequency, transmit the tag information to the reader on the second frequency, and receive the entry permission signal from the reader on the third frequency, a remote controller configured to transmit a manual unlock request to the reader on the second frequency, and receive information indicating whether entry is permitted from the reader on an eighth frequency, and a locker configured to receive an unlock request from the reader by wire or on a seventh frequency, and transmit lock or unlock completion information to the reader on the second frequency, wherein transmitted/received data is primarily encrypted/decrypted using a master key and secondarily encrypted/decrypted using a temporary key, and wherein the transmitted/received data includes information about a frequency for next communication, and thus a transmission/reception frequency varies.

Advantageous Effects

As apparent from the fore-going, a radio-frequency identification (RFID) secure entry method according to the present invention may prevent reverse detection from outside by encrypting data to be transmitted to outside, and transmitting the encrypted data on a randomly generated and allocated frequency.

Furthermore, since a frequency randomly selected within a pre-defined usable frequency list is used for every transmission/reception process, a transmission/reception frequency does not need to be particularly set. In addition, since a different frequency is used every time, the present invention may be easily used without an additional process such as frequency distribution and individual setting, in a narrow place where multiple densely-arranged readers and tags need to simultaneously operate.

Since a reader and a tag according to the present invention communicate with each other on different randomly allocated frequencies, reverse detection of a frequency by a malicious user may be prevented without using a complicated and heavy cryptosystem.

According to the present invention, since data is encrypted/decrypted by exchanging a master key and a temporary key, and the temporary key is generated as a one-time key and discarded when a mutual data transmission/reception identification procedure is terminated, and is replaced with a new temporary key in a new transmission/reception identification procedure, the security level of an identification process may be increased.

DESCRIPTION OF DRAWINGS

The above and other objects, features and other advantages of the present invention will be more clearly understood from the following detailed description taken in conjunction with the accompanying drawings, in which.

BEST MODE

The present invention relates to a radio-frequency identification (RFID) secure entry method capable of enhancing a security function thereof by transmitting and receiving encrypted data between a reader and a tag on different randomly selected frequencies, and a secure entry system using the method. According to the present invention, since different data is exchanged all the time using a pre-shared encryption/decryption algorithm to transmit/receive the same data, even when reverse detection occurs from outside, accurate detection may not be easy. Furthermore, since a frequency for data transmission is randomly allocated within a pre-defined frequency list, reverse detection and jamming during communication may be prevented.

Embodiment 1

Figure 1:
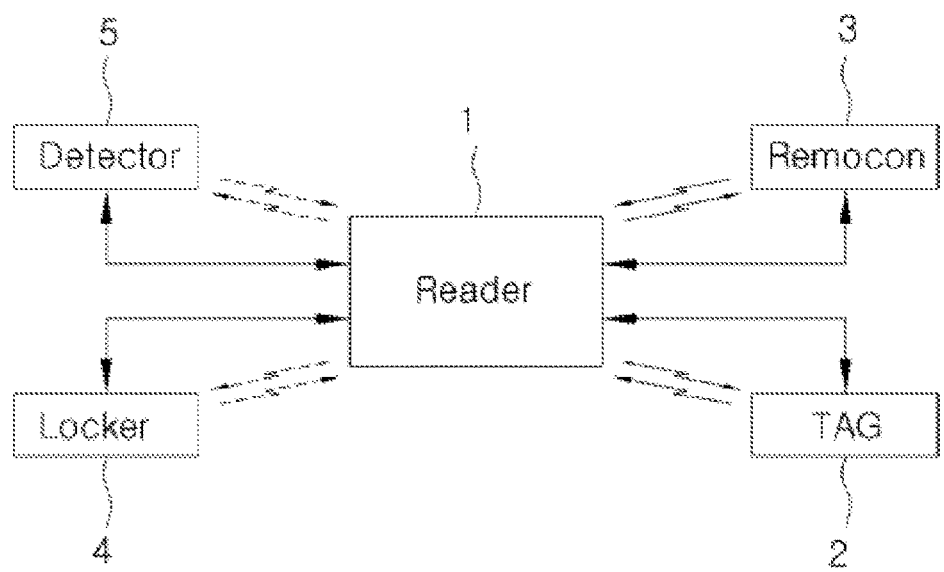
FIG. 1 is a block diagram of a host-less secure entry system according to an embodiment of the present invention.

FIG. 1 is a block diagram of a host-less secure entry system according to an embodiment of the present invention. The host-less secure entry system includes a reader, a detector, a remote controller, a locker, and a tag. The reader determines whether the tag is registered, by comparing the tag to a tag list stored in the reader, and the current embodiment is appropriate for a host-less system having no host.

Figure 2:
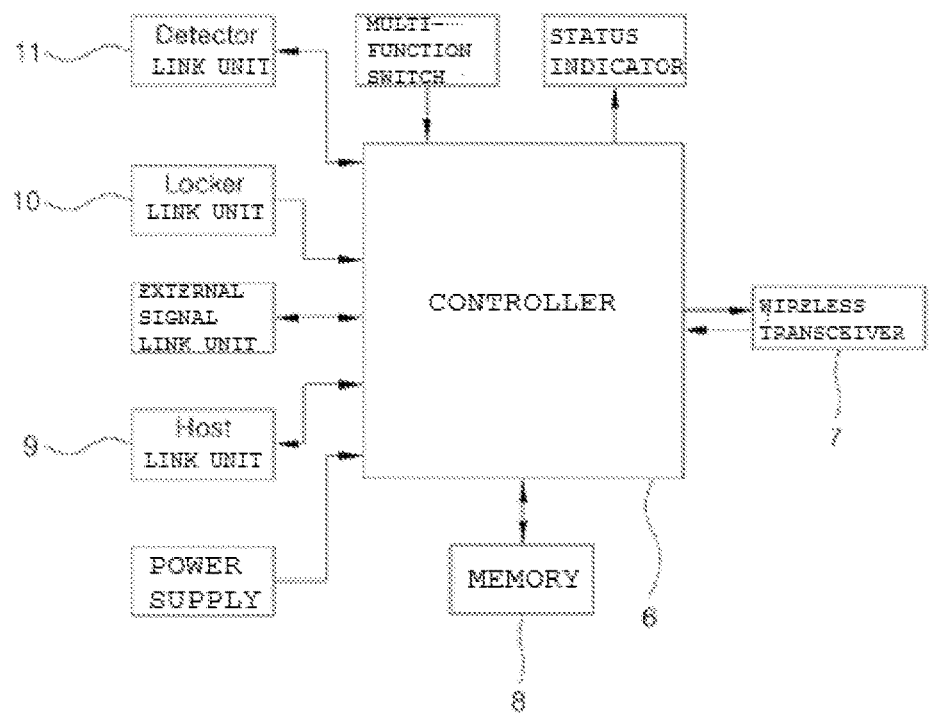
FIG. 2 is a detailed block diagram of a reader.

FIG. 2 is a detailed block diagram of a reader. The reader includes a detector link unit, a locker link unit, a host link unit, a wireless transceiver, a memory, a power supply, and a controller.

The detector link unit communicates with a detector in a wireless or wired manner to receive user access information.

The locker link unit communicates with a locker in a wireless or wired manner to transmit a lock or unlock command received from the controller, to the locker.

The host link unit communicates with a host in a wireless or wired manner to receive a signal from the host or transmits a locker lock or unlock completion signal to the host.

Figure 3:
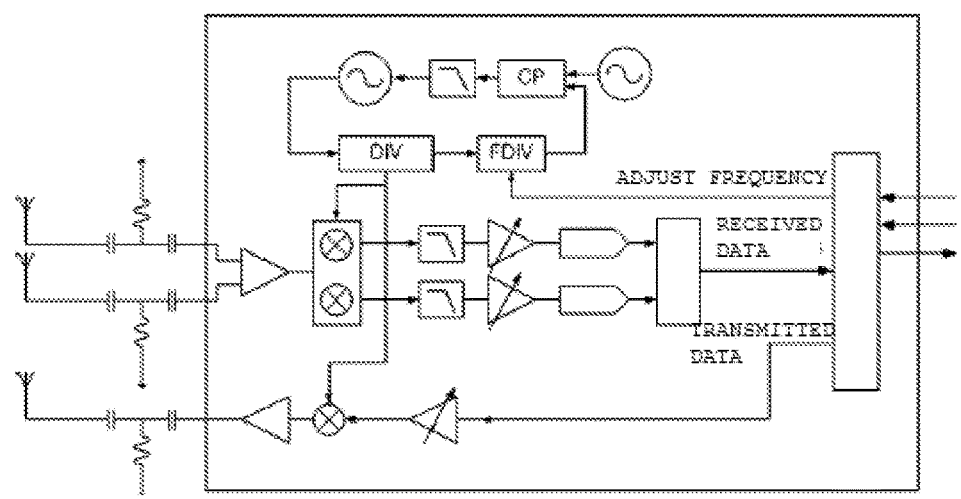
FIG. 3 is a circuit diagram of a reader including a wireless transceiver.

The wireless transceiver transmits or receives a data signal in a wireless manner by adjusting a frequency as shown in FIG. 3. The frequency is adjusted by controlling an oscillation frequency of a voltage controlled oscillator (VCO) using a phase locked loop (PLL). Manipulation to change the frequency for transmission or reception is performed by adjusting an electrical signal by a main computing unit.

The controller controls the detector link unit, the locker link unit, the host link unit, the wireless transceiver, and the memory, and performs computing functions such as randomization and bit exchange.

In addition, the reader may further include a multi-function switch, a status indicator, and an external signal link unit.

Figure 4:
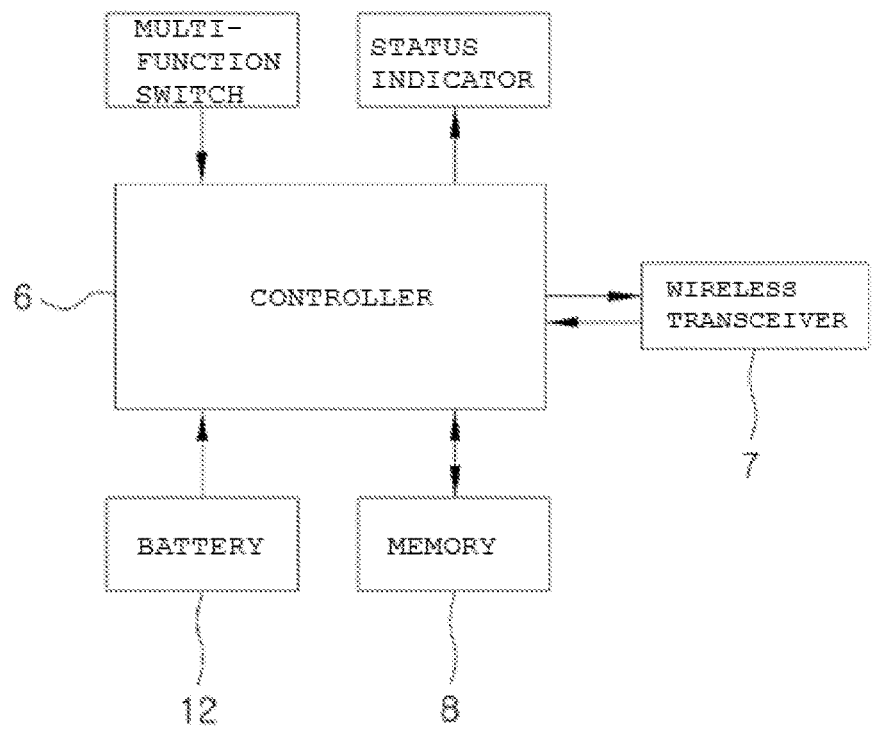
FIG. 4 is a detailed block diagram of a tag.

FIG. 4 is a detailed block diagram of a tag. The tag includes a wireless transceiver, a memory, a controller, and a battery, and may further include a multi-function switch and a status indicator. As one technical feature of the present invention, the tag initially determines whether a reader is a registered reader, using a common identifier (ID) received from the reader, transmits a response signal, e.g., tag information, only if the reader is a registered reader, and does not transmit a response signal if the reader is not a registered reader, thereby preventing leakage of the tag information.

Figure 5:
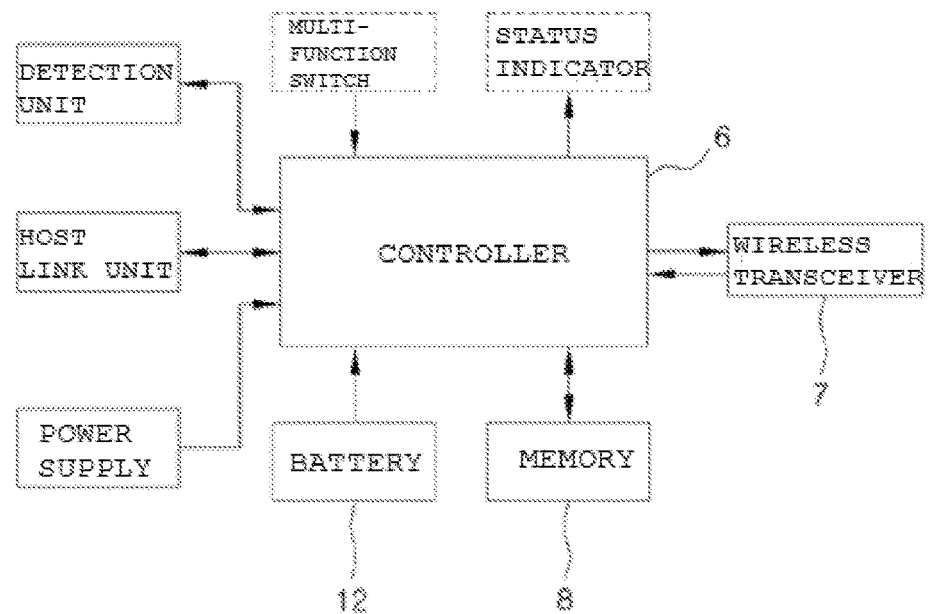
FIG. 5 is a detailed block diagram of a detector.

FIG. 5 is a detailed block diagram of a detector. The detector includes a detection unit, a host/reader link unit, a wireless transceiver, a memory, a power supply, and a controller, and may further include a multi-function switch, a status indicator, and a battery. For example, the detector detects contact access of touching the detection unit or pressing a button by a user who approaches the detection unit, or contactless access using a radio frequency (RF), infrared (IR), or ultrasonic signal, and transmits a result of detection to the reader or a host in a wired or wireless manner.

Figure 6:
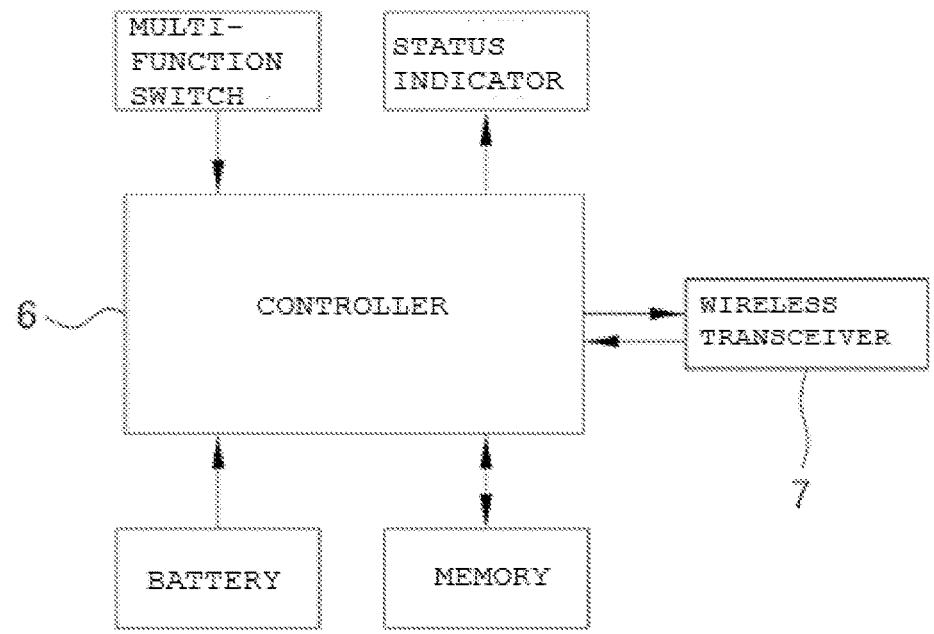
FIG. 6 is a detailed block diagram of a remote controller.

FIG. 6 is a detailed block diagram of a remote controller. The remote controller includes a wireless transceiver, a memory, a controller, and a battery, and may further include a multi-function switch and a status indicator. In the present invention, the remote controller includes components similar to those of a tag but uses a frequency different from that of the tag. The remote controller is used when an operator requests to manually lock or unlock a locker.

Figure 7:
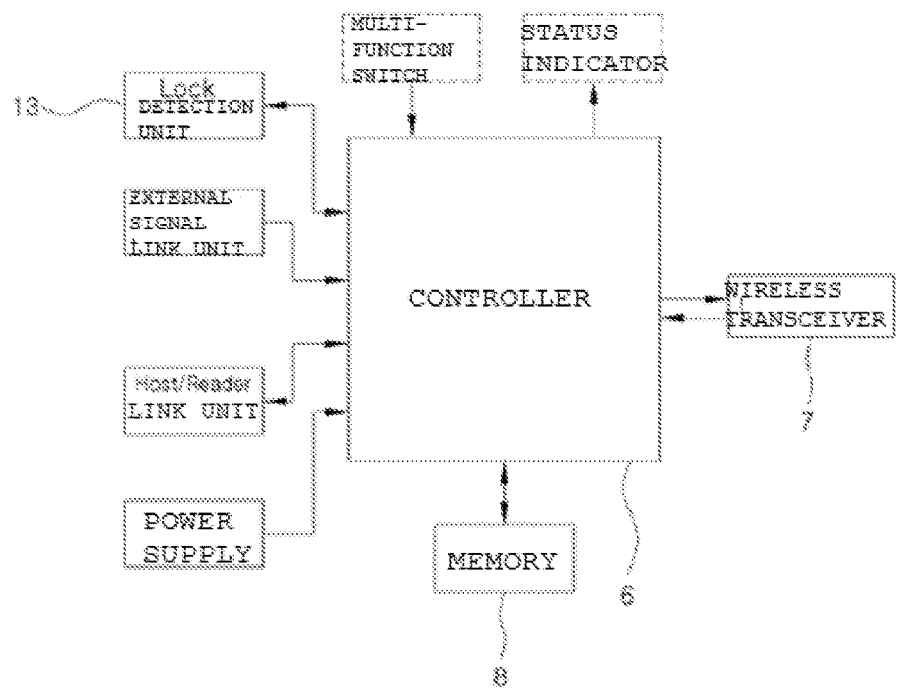
FIG. 7 is a detailed block diagram of a locker.

FIG. 7 is a detailed block diagram of a locker. The locker includes a lock detection unit, a host/reader link unit, a wireless transceiver, a memory, and a controller, and may further include a multi-function switch, a status indicator, and an external signal link unit.

Embodiment 2

Figure 8:
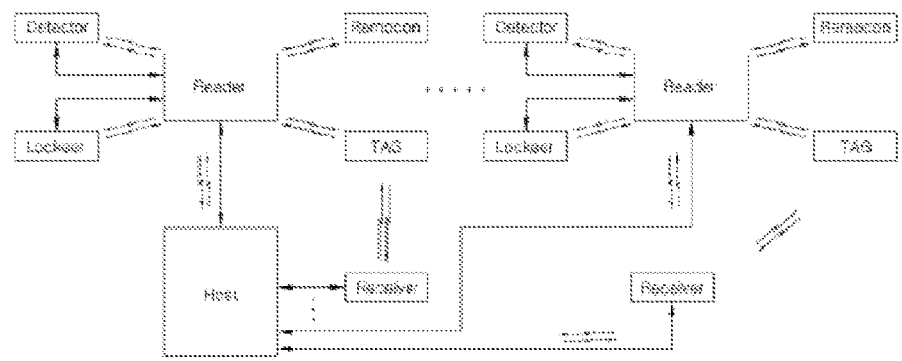
FIG. 8 is a block diagram of a host-linked small-tag-scale secure entry system.

FIG. 8 is a block diagram of a host-linked small-scale tag secure entry system according to another embodiment of the present invention. The host-linked small-scale tag secure entry system includes multiple readers, tags, detectors, lockers, remote controllers, and receivers, and the readers are linked to a host. The reader decrypts received tag information to determine whether the tag is a registered tag, and transmits related process information to the host, and the host receives reports on statuses of the tag and the reader, stores logs, and may determine whether the tag is a registered tag, based on selection of an operator. The current embodiment is appropriate for a small-scale tag system.

The host-linked system includes components similar to those of the host-less system of Embodiment 1, but is characterized in that the operator selects the reader or the host to determine whether the tag is a registered tag, and that information about a location and a route of the tag is obtainable using multiple receivers.

Figure 9:
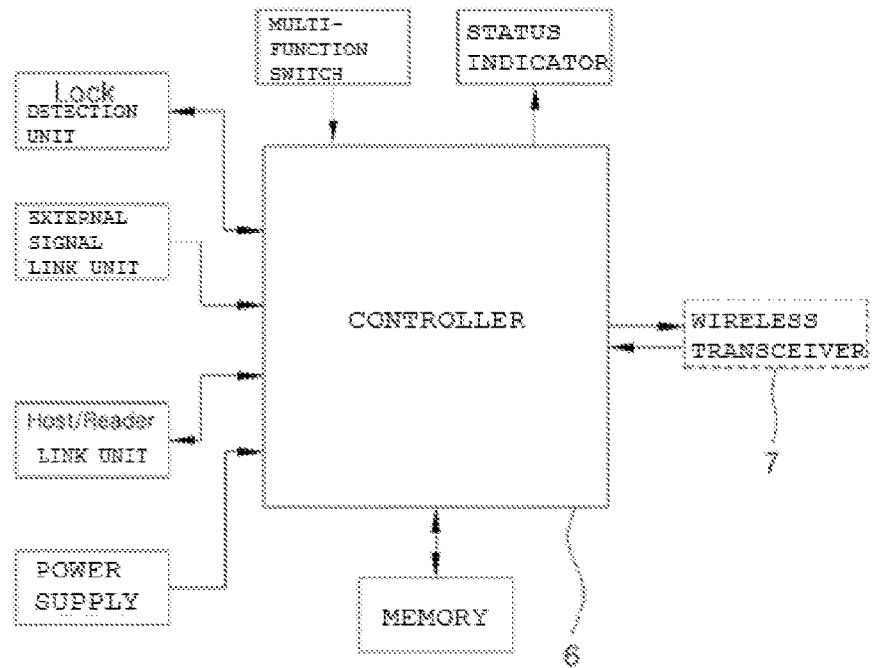
FIG. 9 is a detailed block diagram of a host.

FIG. 9 is a detailed block diagram of a host. The host includes a locker link unit, a reader link unit, a wireless transceiver, a memory, a power supply, and a controller, and may further include a multi-function switch, a status indicator, and an external signal link unit.

Figure 10:
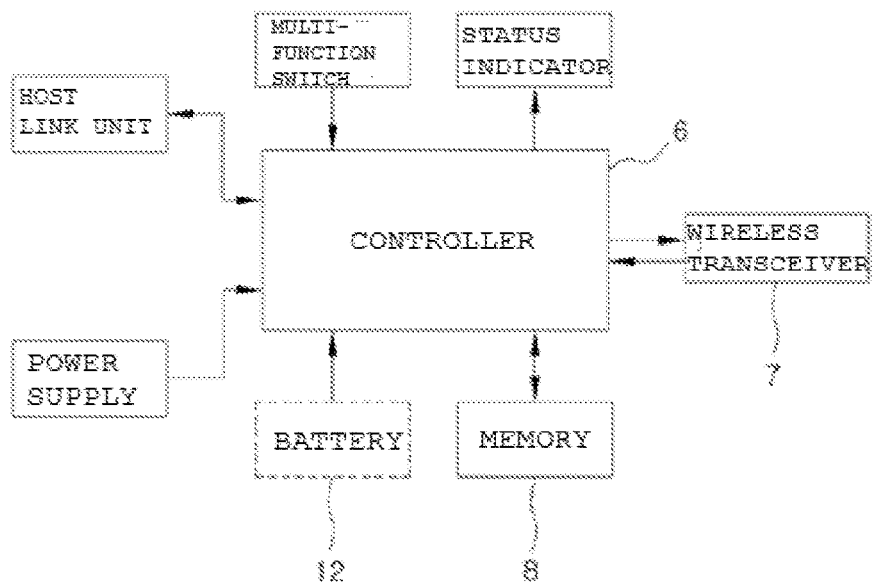
FIG. 10 is a detailed block diagram of a receiver.

FIG. 10 is a detailed block diagram of a receiver. The receiver includes a host link unit, a wireless transceiver, a memory, a power supply, and a controller, and may further include a battery, a multi-function switch, and a status indicator. The receiver periodically or aperiodically receives encrypted tag information from a tag, and periodically or aperiodically transmits the tag information to a host.

Embodiment 3

Figures 11, 12:
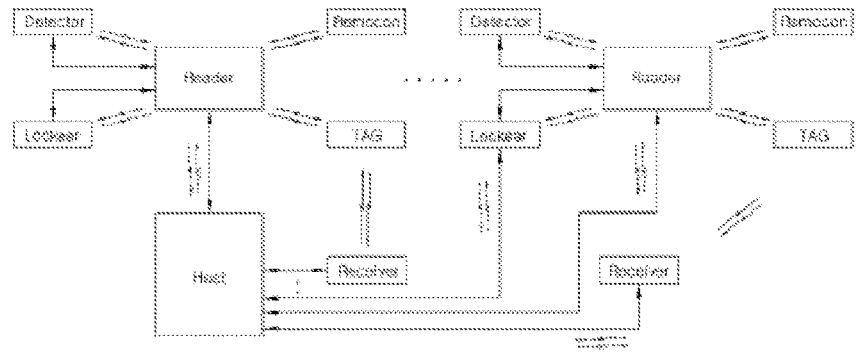
FIG. 11 is a block diagram of a host-linked large-tag-scale secure entry system.
FIG. 12 is a flowchart of a secure entry method using a host-less secure entry system.

FIG. 11 is a block diagram of a host-linked large-scale tag secure entry system according to another embodiment of the present invention. The host-linked large-scale tag secure entry system includes multiple host-less systems each including a reader, a tag, a detector, a locker, and a remote controller, further includes multiple receivers, and is linked to a host. The reader decrypts and transmits received tag information to the host, and the host determines whether the tag is a registered tag, and controls the locker through communication in a wired or wireless manner. The current embodiment is appropriate for a large-scale tag system.

FIG. 12 is a flowchart of a secure entry method using the host-less secure entry system of Embodiment 1.

In the secure entry method, since components exchange different data all the time, even when reverse detection occurs from outside, accurate detection may not be easy. Furthermore, since a frequency for data transmission is randomly allocated within a pre-defined frequency list and only two parties who participate in communication share frequency information, jamming and reverse detection during communication may be prevented. Additionally, since a complicated cryptosystem is not used, data may be rapidly encrypted/decrypted.

The secure entry method according to the present invention is as described below.

Initially, a designated frequency and a variable frequency are set when a secure entry system is installed. The designated frequency refers to a frequency used when a reader transmits or receives signals to or from peripheral devices such as a tag, a locker, and a detector. The designated frequency is fixed when the system is installed, but may be changed by an operator. The variable frequency refers to a frequency channel generable by a PLL within a license-free band, and the reader or the peripheral device selects a frequency to be used for a next response signal, within a shared frequency list.

A common ID and a master key for encryption/decryption are also shared between the reader and the peripheral devices when the system is installed.

When a user approaches the detector installed at a side of an entrance and a detection signal is generated in a contact or contactless manner, the detector transmits the detection signal to the reader by wire or on a second frequency corresponding to the designated frequency.

After receiving the user detection signal from the detector, the reader encrypts data, including an ID of the reader and information about a variable frequency to be used for response, two times using the master key and a temporary key, and transmits the encrypted data together with the temporary key and the common ID to the tag on a first frequency corresponding to the designated frequency. The common ID may be transmitted without being encrypted and thus the tag may rapidly cope with a non-registered reader without a decryption process. The variable frequency is randomly selected within the frequency list shared between the reader and the peripheral devices.

The tag having received the data signal from the reader initially extracts the non-encrypted common ID to compare the extracted common ID to the stored common ID, and returns to a standby mode without decrypting the data and prevents leakage of tag information if the reader is a non-registered reader. If the reader is a registered reader, the tag encrypts the encrypted ID of the reader, information indicating whether a control signal is present, information about a variable frequency for a next response, etc., using the pre-shared master key and a temporary key obtained by modifying the temporary key transmitted from the reader, using an ID of the tag, and transmits the encrypted data together with the common ID to the reader on the allocated variable frequency.

The reader initially extracts the common ID from the received data including the encrypted tag information, the control information, and the variable frequency information, to compare the extracted common ID to the stored common ID, and returns to a standby mode without decrypting the data and prevents leakage of the reader information if the tag is a non-registered tag. If the tag is a registered tag, the reader extracts the ID of the tag through primary and secondary decryption using the shared master key and the temporary key transmitted from the reader, verifies whether the user is a registered tag user, and transmits entry permission information of the tag to the locker by wire or on the designated frequency based on a result of verification.

The reader encrypts data such as the ID of the reader and an additional control signal using the master key and a temporary key as identification completion information, and transmits the encrypted data to the tag. The additional control signal includes a request to transmit peripheral device location information, a request to perform an operation such as lock or unlock, or a request to respond.

For example, a user location and a route pattern may be checked using the additional control signal. When the reader transmits a control signal for additional information such as the user location, the route pattern, and a time to the tag on a third frequency corresponding to the variable frequency set by the tag, the tag transmits an acknowledgement signal to the reader on the second frequency, and may transmit the additional information for the control signal to the reader on a fourth frequency corresponding to the variable frequency set by the reader, periodically or whenever an event occurs.

The locker is unlocked based on the result of verification and then transmits unlock completion information to the reader by wire or on the designated frequency.

In host-less system, an entry method using a remote controller is a method of requesting the reader to manually unlock the locker under the control of the operator, and is performed as described below.

The operator transmits an encrypted manual unlock request to the reader on the designated frequency using the remote controller.

The reader decrypts the manual unlock request of the remote controller using the shared master key to perform identification, transmits the manual unlock request to the locker by wire or on the designated frequency, and transmits identification denial or completion information to the remote controller on the designated frequency.

The locker is manually unlocked and transmits unlock completion information to the reader by wire or on the designated frequency.

The reader transmits a lock request to the locker by wire or on the designated frequency, and the locker is locked and then transmits lock completion information to the reader by wire or on the designated frequency.

In the present invention, an encryption/decryption method using randomly generated master and temporary keys is as described below.

A master key is randomly generated by a reader, shared with peripheral devices when a system is installed, used for primary encryption, and may be periodically or aperiodically changed, updated, or discarded from the reader as instructed by an operator.

Temporary key is randomly generated by the reader as a one-time key, used for secondary encryption, inserted into data in a distributed manner, and discarded after use when a transmission/reception identification session is completed.

Data to be transmitted is encrypted in units of nbits, and a specific pattern, e.g., "0101 . . . ", "0000 . . . ", or "1111 . . . ", is randomly inserted when all bits are not completely filled.

Transmitted/received data includes an ID of the reader or the peripheral device, a control signal, and information about a variable frequency for a next communication process.

For example, when 32-bit data is configured as {D1, D2, . . . Dn}, if the data is encrypted using the master key, the order of data is changed into, for example, {D3, D1, D6, D22, D10, . . . , D4}. If the data is encrypted using the temporary key, the order of data may be changed into, for example, {D2, D7, D10, D5, D22, . . . , Dn−4} differently from the case when the master key is used. The 32-bit data is merely an example and the number of bits is not limited thereto.

The temporary key may have a length corresponding to half of the length of the master key. When the master key is 32 bits, the temporary key may be 16 bits.

The master key is generated by the reader through random extraction, shared between and stored in the reader and the peripheral devices when the system is installed, and may be periodically or aperiodically changed by the operator.

The temporary key is also generated through random extraction as a one-time key, used for secondary encryption, and inserted into completely encrypted data in a distributed manner. The reader is involved in insertion/extraction of the temporary key, and serves to store and discard the temporary key. The temporary key is transmitted to a tag when the tag is registered, and the completely encrypted data is transmitted after inserting cyclic redundancy check (CRC) bits there into.

Figure 13:
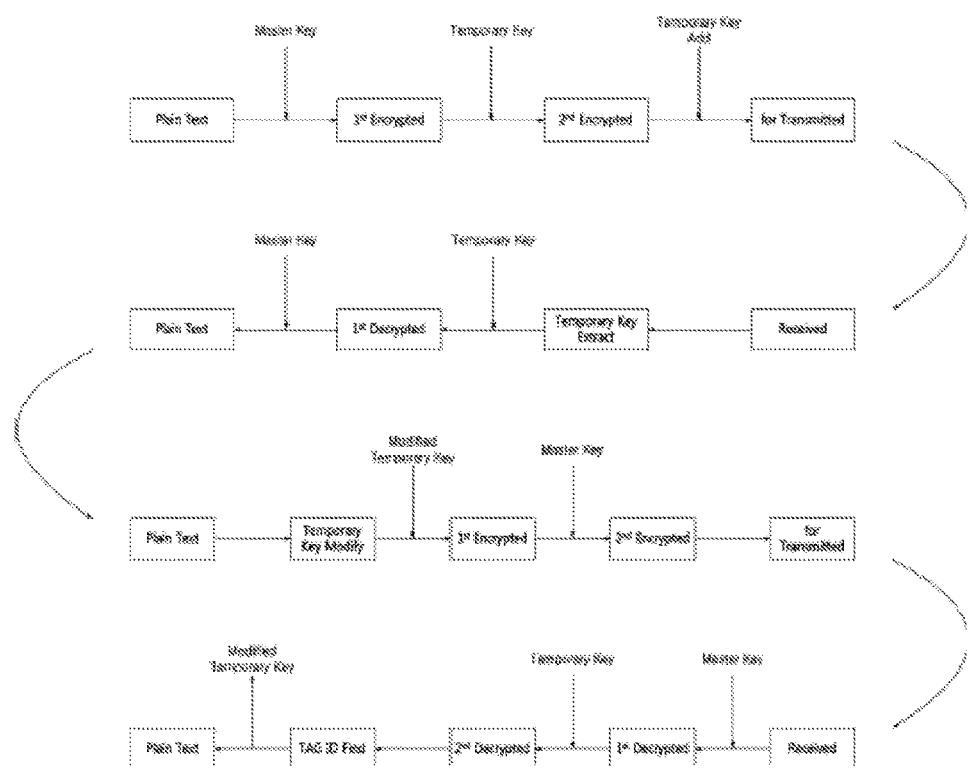
FIG. 13 is a flowchart of an encryption/decryption method.

An encryption/decryption procedure using master and temporary keys is performed based on FastScripts as illustrated in FIG. 13.

Initially, a reader primarily encrypts a reader ID, additional control information, and information about a variable frequency for next use, which are provided in plaintext, together with a master key. In addition to primary encryption, secondary encryption is performed using a temporary key randomly generated for each transmission/reception session and to be discarded after use, and the reader transmits the encrypted data together with a common ID to a tag.

The tag extracts the common ID from the data transmitted from the reader, compares the extracted common ID to a shared common ID to determine whether the reader is a registered reader, and returns to a standby mode without performing decryption if the reader is a non-registered reader. If the reader is a registered reader, the tag performs primary decryption by extracting the temporary key, and then performs secondary decryption using a shared master key, thereby restoring the original data. The tag double checks the reader ID in the restored data and then decrypts query data of the reader.

The tag performs primary encryption and secondary encryption using the pre-shared master key and a temporary key modified by the tag, and then transmits the encrypted data together with the common ID to the reader. In this case, the common ID is not encrypted and thus the reader may rapidly determine whether the tag is a registered tag.

The reader extracts the common ID from the received data to determine whether the tag is a registered tag. If the tag is a registered tag, the reader performs decryption using the pre-shared master key and the temporary key transmitted from the reader, to extract the ID of the tag and to determine whether the tag is a registered tag, and decrypts the data to plain text using the temporary key modified by the tag.

In a small-scale or large-scale system, a receiver installed in a specific place to transmit and receive data to and from a tag in a wireless manner may be used to check an approximate location and a route of a tag user by receiving a signal of the tag on a designated frequency and transmitting the signal to a host periodically or whenever an event occurs.

A reader determines whether to allow entry of a user, using decrypted user information, and a master key may be generated and discarded only by the reader or a host computer.

The reader and the tag used in the present invention serve to read, write, and store data.

In the present invention, a frequency band is a license-free band broadly used for electronic tags, e.g., a 125 kHz, 13.56 MHz, 424.7 to 424.95 MHz, 447.2625 to 447.9875 MHz, 860 to 960 MHz, or 2.45 GHz band, but is not limited thereto. Different identification speeds, environmental influences, tag sizes, or major applicable fields may be applied to frequency bands based on propagation characteristics of each frequency band.

When the present invention is used in an environment including multiple densely-arranged readers, frequencies 1, 2, 3, . . . , n−1, and n may be jammed and thus a problem such as data processing failure or waiting time-out may occur. In this case, data should be re-transmitted and processed a certain number of times after a certain period of time using a specific algorithm.

According to the present invention, stable communication is enabled without making efforts to prevent frequency jamming occurring due to, for example, inappropriate frequency distribution in a variable external environment and an environment where multiple readers/tags are used (particularly, an environment where multiple densely-arranged readers and tags are simultaneously used in a narrow place). In a frequency transmission/reception method for communication on a different frequency every time, since data is exchangeable with time synchronization of transmission/reception frequencies only between two parties, e.g., a reader and a tag, who participate in transmission/reception, the method is very resistant to, for example, wiretapping or reverse detection from outside.

The present invention is appropriate for a speed gate in which multiple readers and tags are simultaneously used within a short distance, and may minimize frequency jamming and provide stable data communication.

INDUSTRIAL APPLICABILITY

The present invention may be used in an environment where multiple densely-arranged readers and tags need to be simultaneously used and frequency jamming can occur due to inappropriate frequency distribution in a narrow place, e.g., a speed gate.

In addition, the present invention may be variously modified and applied based on a system scale, e.g., a host-less secure entry system, a host-linked small-scale tag secure entry system, or a host-linked large-scale tag secure entry system.

The invention claimed is:

1. A secure entry method of a secure entry system comprising a reader, and a detector, a remote controller, a locker, and a tag corresponding to peripheral devices connected to and communicating with the reader in a wireless or wired manner, the method comprising:
 a first step of transmitting and sharing a common identifier (ID), a master key, and a frequency list to and with the tag by the reader to register the tag;
 a second step of primarily encrypting data using the master key, secondarily encrypting the data using a temporary key, and transmitting the encrypted data together with the temporary key and the non-encrypted common ID to the tag on a first frequency corresponding to a designated frequency, by the reader to transmit the data to the tag in a wireless manner;
 a third step of extracting the common ID from the received data, comparing the extracted common ID to the stored common ID to primarily determine whether the reader is a registered reader, if the reader is a non-registered reader, returning to a standby mode without decrypting the data, and, if the reader is a registered reader, extracting the temporary key, primarily decrypting the received encrypted data using the temporary key, and secondarily decrypting the data using the master key to secondarily determine whether the reader is a registered reader and to check a variable frequency, by the tag;
 a fourth step of primarily encrypting data using the master key, secondarily encrypting the data of the fourth step using a temporary key, and transmitting the encrypted data on a second frequency corresponding to the variable frequency set by the reader, by the tag; and
 a fifth step of primarily decrypting the data received on the second frequency, using a temporary key, and secondarily decrypting the data using the master key to determine whether to permit entry, by the reader,
 wherein transmitted/received data between the reader and the tag comprises an ID of the reader or the peripheral device, a control signal, and information about a variable frequency for next communication,
 wherein the designated frequency is defined when the system is installed, and
 wherein the variable frequency is randomly selected within the frequency list set when the system is installed.

2. The secure entry method of claim 1, wherein, after the fifth step, to check a location and a route pattern of a user, the reader transmits a control signal for additional information to the tag on a third frequency corresponding to a variable frequency set by the tag, and the tag transmits an acknowledgement signal to the reader on the second frequency and transmits the additional information for the control signal to the reader on a fourth frequency corresponding to a variable frequency set by the reader, periodically or whenever an event occurs.

3. The secure entry method of claim 1, wherein the master key is randomly generated by the reader, shared with the peripheral devices when the system is installed, used for primary encryption, and periodically or aperiodically changed, updated, or discarded from the reader as instructed by an operator, and wherein the temporary key is randomly generated by the reader as a one-time key, used for secondary encryption, inserted into the data in a distributed manner, and discarded after use when a transmission/reception identification session is completed.

4. The secure entry method of claim 1, wherein, in a host-linked system, the reader of the fifth step transmits the decrypted data to a host, and the host determines whether to permit entry and transmits a result of determination to the reader.

5. A secure entry system comprising:
a detector installed at an entrance to detect a user in a contact or contactless manner, transmit a detection signal to a reader by wire or on a second frequency corresponding to a designated frequency, and receive an acknowledgement signal from the reader on a ninth frequency;

the reader configured to transmit a reader identifier (ID) to a tag on a first frequency, receive tag information from the tag on the second frequency, and transmit an entry permission signal to the tag on a third frequency;

the tag configured to receive the reader ID on the first frequency, transmit the tag information to the reader on the second frequency, and receive the entry permission signal from the reader on the third frequency;

a remote controller configured to transmit a manual unlock request to the reader on the second frequency, and receive information indicating whether entry is permitted, from the reader on an eighth frequency; and a locker configured to receive an unlock request from the reader by wire or on a seventh frequency, and transmit lock or unlock completion information to the reader on the second frequency, wherein transmitted/received data is primarily encrypted/decrypted using a master key and secondarily encrypted/decrypted using a temporary key which is randomly generated and then discarded after one-time use, and wherein the transmitted/received data comprises information about a frequency for next communication, and thus a transmission/reception frequency varies using a phase locked loop (PLL).

* * * * *